June 3, 1941.    H. W. BRAUN    2,244,186
FLOUR SIFTER
Filed Oct. 3, 1939    2 Sheets-Sheet 1

Henry W. Braun, INVENTOR
BY Victor J. Evans & Co.
ATTORNEYS

June 3, 1941.                    H. W. BRAUN                    2,244,186
                                 FLOUR SIFTER
                              Filed Oct. 3, 1939                2 Sheets-Sheet 2
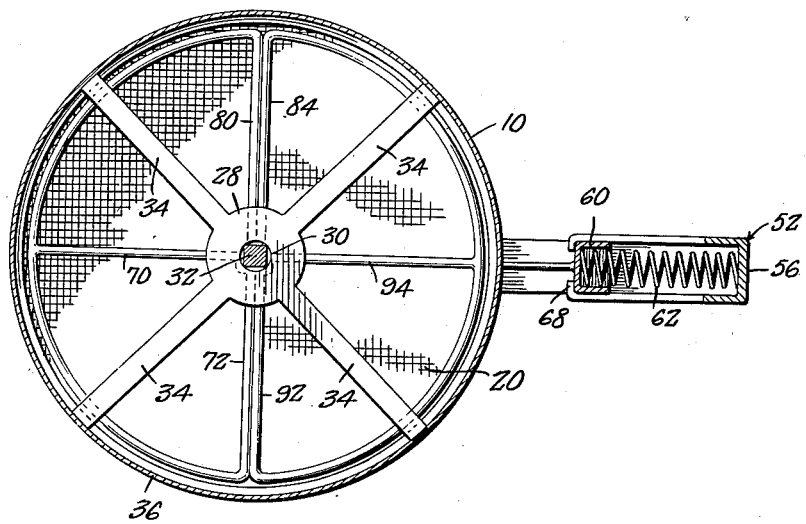
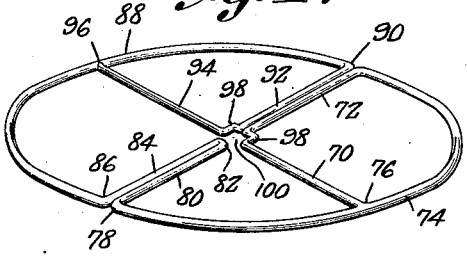
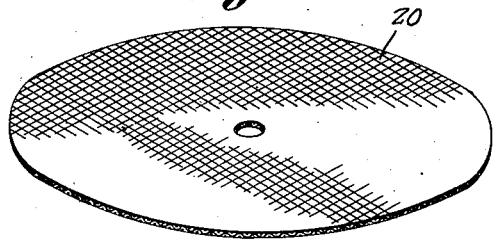
Henry W. Braun,
                                                    INVENTOR
                              BY Victor J. Evans & Co.
                                                    ATTORNEYS Patented June 3, 1941

2,244,186

UNITED STATES PATENT OFFICE 2,244,186

FLOUR SIFTER

Henry W. Braun, Coldwater, Mich.

Application October 3, 1939, Serial No. 297,748

1 Claim. (Cl. 209—251)

My invention relates to sifters, and has among its objects and advantages the provision of an improved flour sifter.

Multiple sifters of conventional design consist of an open ended casing within which a plurality of sieves are mounted in superposed relation in combination with a plurality of agitators. The agitators are usually interconnected for simultaneous operation through the medium of a rotary shaft for operating all the agitators to cause the flour to successively pass by gravity through the several sieves and out of the lower end of the casing. The number of times that the flour is sifted depends upon the number of sieves in the unit. Naturally, to secure a large number of sieving actions, a large number of sieves must be employed. Multiplying the number of sieves complicates the construction, lends weight thereto and increases the cost of the device. Since the number of sieving actions is limited to the number of sieves in the unit, additional sifting can be done only by again placing the flour in the sifter for further treatment.

An object of my invention is to provide a flour sifter embodying a limited number of sieves in combination with a casing which may be closed at its ends with the sieves so arranged as to permit a reverse sifting action, to the end that the flour may be sifted time and time again without recharging the sifter casing. The casing is provided with a hinged cover at each end and each sieve is provided with an individual agitator means.

A further object is to provide a flour sifter wherein the agitators are connected for simultaneous oscillatory wiping action relative to their respective sieves through the medium of a novel reciprocatory actuating mechanism which may be grasped in one hand and manipulated with little effort.

Another object is to provide a reversible sifter provided with sieves in combination with agitators arranged in wiping relation with both sides of the sieves, thereby permitting reversal of the unit for repeat siftings.

In the accompanying drawings:

Figure 3 is a sectional view along the line 3—3 of Figure 1;

Figure 4 is a perspective view of one of the agitators; and

Figure 5 is a perspective view of one of the sieves.

Figure 1:
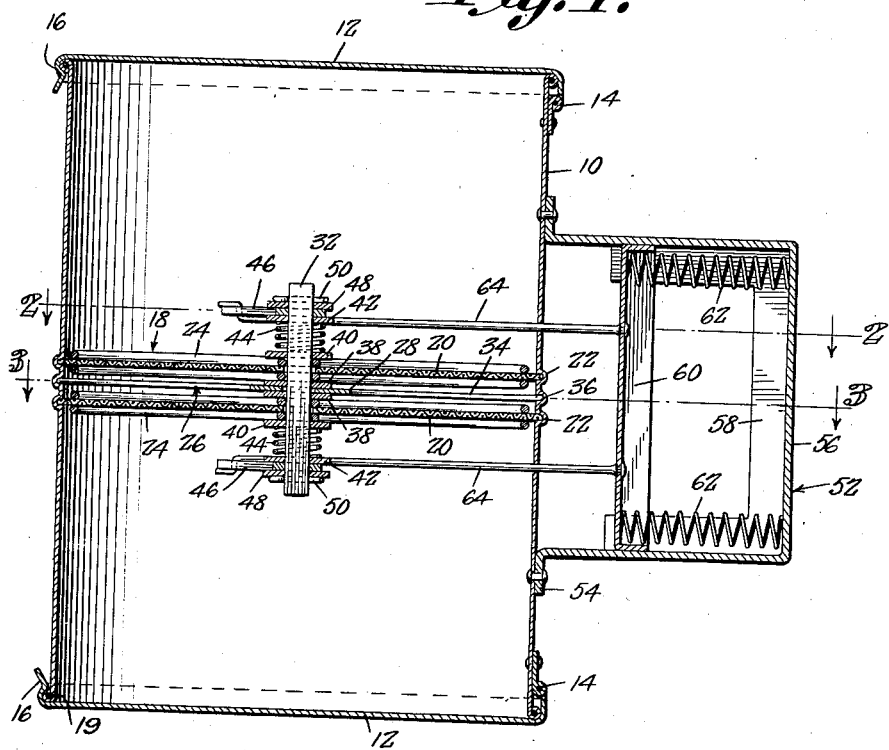
Figure 1 is a vertical sectional view of my invention.
Figure 2:
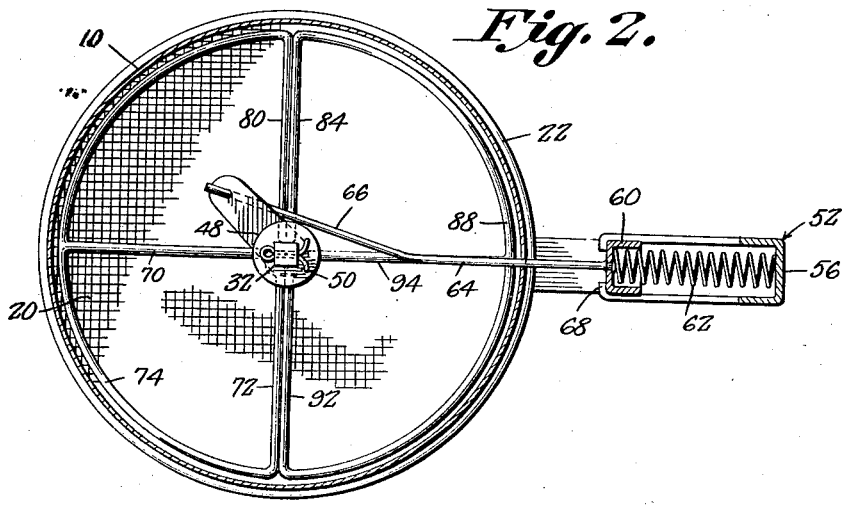
Figure 2 is a sectional view along the line 2—2 of Figure 1.

In the embodiment selected to illustrate my invention, I make use of a casing 10 provided with covers 12 for closing its ends. The covers are hingedly connected at 14 with the casing, and each cover includes a resilient lip 16 arranged to have latching relation with the bead 19 formed about each end of the casing 10. The covers 12 may be swung to positions in the clear of the ends of the casing. For loading purposes, one cover is moved to an open position and the flour is placed in the casing. The casing may be charged through either end.

Intermediate the ends of the casing 10 I mount a sifter assembly 18. Assembly 18 comprises a pair of sieves 20 having their peripheral margins disposed in grooves 22 formed by striking out the material of the casing 10. Adjacent each side of each sieve 20 I mount an oscillatory agitator 24. The agitators have wiping relation with both sides of their respective sieves 20. Sieves 20 are fixedly related to the casing 10, and the agitators 24 are of such diameters as to oscillate freely inside the casing 10.

Between the two inner agitators 24 I mount a spider 26 provided with a central plate 28 having a bore 30 for the reception of a square shaft 32. Spider 26 includes radial arms 34 having their outer ends pinched in the groove 36 struck in the wall of the casing 10. Shaft 32 is rotatably related to the spider 26. Washers 38 are positioned adjacent the two faces of the plate 28 and adjacent the inner agitators 24, while washers 40 are positioned adjacent the outer faces of the other agitators 24. Washers 38 and 40 are preferably provided with square openings for the reception of the shaft 32.

Between the washers 40 and 42 I interpose compression springs 44. An actuating arm 46 is mounted on the shaft 32 adjacent each of the washers 42, and is provided with a square opening to have keyed connection with the shaft. Adjacent each actuating arm 46 I position a washer 48 which is restrained from relative longitudinal movement on the shaft by a key pin 50. It will thus be seen that the compression springs 44 urge the agitators 24 into effective pressure relation with respective sieves 20.

To the outer face of the casing 10 I connect a U-shaped grip 52, the legs of which are flanged at 54 and riveted to the casing. The legs and bight 56 of the grip are flanged at 58 and a channel shaped member 60 has its ends slidably disposed between the flanges associated with the legs of the grip. Between the channel shaped member 60 and the bight 56 I interpose compression springs 62.

Two rods 64 are fixedly connected with the member 60 and extend through openings in the casing 10 for connection with the other ends of the actuating arms 46. Rods 64 are bent obliquely at 66 so as to have clearance with respect to the washers 42. Figure 1 illustrates the normal position of the channel shaped member 60, at which time the member bears against the inturned flanges 68.

Agitators 24 are oscillated through manipulation of the channel shaped member 60. In operation, the grip 52 is positioned in the palm of a hand with the fingers grasping the member 60. The member 60 is then pulled in the direction of the bight 56 against the tension of the springs 62, which movements impart rotary motion to the shaft 32 for rotating the agitators. As pressure is released from the member 60, springs 62 will urge the member 60 back to the position of Figure 1.

Agitators 24 are keyed to the shaft 32 for rotation therewith, while the compression springs 44 hold the agitators in effective wiping relation with their respective sieves. It will thus be seen that repeated manipulation of the member 60 will cause continued oscillation of the agitators 24.

One end of the casing 10 is filled with flour to be sifted, after which the agitators are manipulated for passing the flour through the sifter assembly 18 into the other end of the casing. As all the flour is sifted through the sifter assembly, the sifter is turned end to end and the agitating action continued for again passing the flour through the sifter assembly. It will thus be seen that the flour may be sifted repeatedly to any desired extent. The sifter is relatively light in weight because of the limited number of sieves and agitators. However, the reversible feature permits an unlimited number of sifting actions. Covers 12 are effectively latched to the casing 10, but may be moved to uncovered position.

Figure 4 illustrates the specific construction of the agitators 24. The agitator illustrated comprises a piece of wire bent to provide a first radial reach 70 and a second radial reach 72 arranged at right angles thereto. The wire is then bent to provide the semi-circular run 74 with the end of the wire welded at 76 to the curved run 74. Curved run 74 is bent at 78 to provide a radial reach 80 arranged at right angles to the reach 70. I then bend the wire back upon itself at 82 to provide a radial reach 84 paralleling the reach 80, and the reach 84 is bent at 86 to provide a semi-circular run 88. The opposite end of the semi-circular run 88 is bent at 90 to provide a radial reach 92 paralleling the radial reach 72. The wire is then shaped to provide a radial reach 94 having its end welded to the semi-circular run 88, as at 96. Runs 70 and 72 are deformed at adjoining ends to provide a right angle 98, which is also true of the reaches 92 and 94. Bend 82 is so related to the right angle 98 as to define a rectangularly shaped opening 100 closely embracing the square shaft 32 to be keyed to the shaft for rotation therewith.

Without further elaboration, the foregoing will so fully illustrate my invention that others may, by applying current knowledge, readily adapt the same for use under various conditions of service.

I claim:

A sifter comprising an open ended tubular casing, sieves fixed inside the casing intermediate its ends and spaced one from the other, oscillatory agitators mounted upon opposite sides of the sieves, a spider fixed inside the casing between said sieves, said spider, said sieves and said agitators being provided with aligned openings, a shaft extending through said aligned openings, said shaft being rotatable in the openings in said spider and said sieves, but keyed to the agitators for rotating the latter with the shaft, with the agiators movable longitudinally of the shaft, springs engaging the two agitators on the outer faces of the sieves, means acting on said shaft and said springs for holding the latter compressed to press the two outside agitators against their respective sieves and the two inside agitators against said spider and against the inner sides of their respective sieves, and manually actuated reciprocatory means operatively connected with the agitators for oscillating the latter.

HENRY W. BRAUN.